(12) United States Patent
Xu et al.

(10) Patent No.: US 8,695,953 B2
(45) Date of Patent: Apr. 15, 2014

(54) DISTRIBUTION TRAY, VESSEL, OR METHOD RELATING THERETO

(75) Inventors: Zhanping Xu, Inverness, IL (US); Richard S. Hatami, Inverness, IL (US); Lev Davydov, Northbrook, IL (US)

(73) Assignee: UOP LLC, Des Plaines, IL (US)

( * ) Notice: Subject to any disclaimer, the term of this patent is extended or adjusted under 35 U.S.C. 154(b) by 626 days.

(21) Appl. No.: 12/961,208

(22) Filed: Dec. 6, 2010

(65) Prior Publication Data

US 2012/0138175 A1    Jun. 7, 2012

(51) Int. Cl.
    *B01F 3/04*    (2006.01)
(52) U.S. Cl.
    USPC .......................... 261/97; 261/110; 261/114.5
(58) Field of Classification Search
    USPC ................... 261/114.1, 114.2, 114.5, 97, 110
    See application file for complete search history.

(56) References Cited

U.S. PATENT DOCUMENTS

| | | | |
|---|---|---|---|
| 2,006,986 A * | 7/1935 | De Florez | 261/114.1 |
| 2,609,277 A * | 9/1952 | McNamara | 423/658.5 |
| 4,140,501 A | 2/1979 | Ekman | |
| 4,140,625 A | 2/1979 | Jensen | |
| 4,514,196 A | 4/1985 | Herrlander | |
| 4,526,757 A | 7/1985 | Gupta | |
| 4,661,306 A | 4/1987 | Fensterer et al. | |
| 4,874,583 A * | 10/1989 | Colvert | 422/143 |
| 5,110,325 A | 5/1992 | Lerner | |
| 5,232,283 A | 8/1993 | Goebel et al. | |
| 5,635,145 A | 6/1997 | Den Hartog et al. | |
| 5,837,208 A | 11/1998 | Grott et al. | |
| 5,904,907 A | 5/1999 | Shih | |
| 5,918,637 A | 7/1999 | Fleischman | |
| 5,942,162 A | 8/1999 | Gamborg et al. | |
| 6,015,633 A | 1/2000 | Carlstrom, Jr. et al. | |
| 6,314,752 B1 | 11/2001 | Christensen et al. | |
| 6,656,250 B1 | 12/2003 | Listner et al. | |
| 6,769,672 B2 | 8/2004 | Muller | |
| 7,473,405 B2 | 1/2009 | Kemoun et al. | |
| 7,506,861 B2 | 3/2009 | Muller | |
| 7,600,742 B2 | 10/2009 | Breivik | |
| 7,601,310 B2 | 10/2009 | Breivik et al. | |
| 8,211,375 B2 * | 7/2012 | Parimi et al. | 422/220 |
| 2005/0082696 A1 | 4/2005 | Jacobs et al. | |
| 2006/0163758 A1 | 7/2006 | Muller | |
| 2007/0013088 A1 | 1/2007 | Robertson | |
| 2009/0294997 A1 | 12/2009 | Monkelbaan | |

OTHER PUBLICATIONS

PCT International Preliminary Report on Patentability dated Jun. 20, 2013 for PCT/US2011/062636.

(Continued)

*Primary Examiner* — Charles Bushey
(74) *Attorney, Agent, or Firm* — Mark R Willis

(57) ABSTRACT

One exemplary embodiment may be a distribution tray for a vessel. Generally, the distribution tray includes a member, a compartment, and an insert. The member can form a first side and a second side. Typically, the first side is adapted to receive a liquid thereon. Additionally, the member can form a plurality of openings. Usually, the compartment extends through the member with a first portion protruding from the first side and a second portion protruding from the second side, and is adapted to permit the passage of a fluid there-through. The insert may be positioned within the compartment to constrict and then expand the passage of the fluid there-through.

14 Claims, 7 Drawing Sheets

(56) References Cited

OTHER PUBLICATIONS

Huynh et al., "Hydrodynamics and Mass Transfer in an Upward Venturi/Bubble Column Combination", The Canadian Journal of Chemical Engineering, Jun. 1991, vol. 69, No. 3, pp. 711-722.

Jacobs et al., "Evaluating Liquid Distributors in Hydroprocessing Reactors", Hydrocarbon Processing, Nov. 2000, vol. 79, No. 11, pp. 76-78, 80, 82, 84.

Ouwerkerk et al., "Performance Optimisation of Fixed Bed Processes", Petroleum Technology Quarterly, Spring 1999, vol. 4, No. 1, pp. 21-22, 24, 27-28, 30.

* cited by examiner

DISTRIBUTION TRAY, VESSEL, OR METHOD RELATING THERETO

FIELD OF THE INVENTION

The invention generally relates to a distribution tray for a vessel for passing a fluid there-through.

DESCRIPTION OF THE RELATED ART

Various vessels can be used in chemical processing, petroleum refining, and other industries for distributing fluids, particularly a mixed-phase fluid of liquid and gas over beds or trays. One particular vessel can be a reactor, such as a trickle flow reactor, that can be used in processes such as catalytic dewaxing, hydrotreating, hydrodesulfurizing, hydrofinishing, and hydrocracking. Generally, a feed, such as a fluid including one or more liquids and gases, can pass over a particulate catalyst contained in a packed bed in a downflow reactor. Chemical reactions can take place that may produce additional components in a gas phase, such as hydrogen sulfide and ammonia, in some hydrotreating processes. Such gases and liquids typically flow downward through the packed bed and exit a bottom outlet.

To facilitate reactions, a solid catalyst is often arrayed in a plurality of beds with a distributor plate or tray above each bed for the purpose of uniformly, effectively, and efficiently distributing the fluid at the top of the bed.

Generally, trays can be provided with distributors to provide an equally divided flow across the underlying bed. However, these distributors can suffer from shortcomings when, for example, ideal conditions are not present and an unequal distribution of liquid occurs. As an example, non-ideal distribution conditions can exist during the start-up of a unit, e.g., after maintenance is conducted. These non-ideal conditions can lead to an inefficient wetting of the catalyst bed below the distributor. This uneven wetting can create hotspots in the catalyst bed leading to one or more pockets of shortened catalyst life. In addition, an uneven flow of liquid can create channeling through the bed. As a consequence, it is desirable to provide a distributor that provides better and consistent wetting of the underlying catalyst bed to avoid these shortcomings and extend the catalyst life.

Moreover, often it is desirable to provide distributors that are relatively uncomplicated to manufacture. As a consequence, it is desirable to provide a distributor that can efficiently and effectively provide even flow of fluid.

SUMMARY OF THE INVENTION

One exemplary embodiment may be a distribution tray for a vessel. Generally, the distribution tray includes a member, a compartment, and an insert. The member can form a first side and a second side. Typically, the first side is adapted to receive a liquid thereon. Additionally, the member can form a plurality of openings. Usually, the compartment extends through the member with a first portion protruding from the first side and a second portion protruding from the second side, and is adapted to permit the passage of a fluid there-through. The insert may be positioned within the compartment to constrict and then expand the passage of the fluid there-through.

Another exemplary embodiment may be another distribution tray for a vessel. Generally, the distribution tray includes a member, a compartment, and an insert. The member can form a first side and a second side. Typically, the first side is adapted to receive a liquid thereon. Additionally, the member can form a plurality of openings. Usually, the compartment extends through the member with a first portion protruding from the first side and a second portion protruding from the second side, and is adapted to permit the passage of a fluid there-through. The insert may be positioned within the compartment to constrict and then expand the passage of the fluid there-through. Usually, the compartment has a height and the constriction is positioned in an upper half of the compartment.

Yet a further exemplary embodiment is a method of modifying a distribution tray. The method can include coupling an insert to an interior of a compartment to constrict the passage of a fluid there-through. Generally, the compartment is coupled to a member at an opening so the compartment protrudes from at least one side of the member.

The embodiments disclosed herein can provide a compartment having a circular periphery and adapted to receive an insert therein. The insert can form a venturi-shape throat within the compartment, such as a tube. As such, the throat can create a high-driving force for liquid flow through the distribution tray. As such, any effect of tray unlevelness on liquid distribution may be minimized. Additionally, the pressure drop across the tray may be minimized as some of the pressure drop can be recovered within the venturi insert.

Moreover, the gas-liquid mixing is typically enhanced by passing the fluid through a constriction or convergence and then out through a divergent cone in the throat of the venturi-shape insert. Thus, the use of the venturi-shape insert can increase the gas-liquid covering area after the fluid exits the distributor. In addition, holes can be provided on the upper portions of the tubular compartment to increase operating range of the fluid flow. Furthermore, fluid flow through each of the distribution tubes typically can be driven not only by the liquid head on the tray, but also by the pressure difference between the liquid on the tray and the fluid inside the tube. Therefore, the fluid flow through the throat can be less dependent on the liquid head of the tray, and hence, its unequal distribution if a tray is unlevel. Particularly, the throat may create an increased fluid velocity and thus, a lower pressure to facilitate the drawing of liquid from the tray into the tube. Hence, liquid can be sprayed over any bed positioned therebelow.

DEFINITIONS

As used herein, the term "fluid" can mean one or more gases and/or one or more liquids.

As used herein, the term "gas" can mean a single gas or a solution of a plurality of gases. In addition, the term "gas" may include a solution or a suspension, e.g., a vapor or an aerosol, of one or more liquid particles and/or one or more solid particles, of the same or different substances, in one or more gases.

As used herein, the term "liquid" can mean a single liquid, or a solution or a suspension of one or more liquids with one or more gases and/or solid particles.

As used herein, the term "absorption" can collectively refer to several processes, including adsorbing and absorbing.

As used herein, the term "rich" can mean an amount generally of at least about 50%, and preferably about 70%, by mole, of a compound or class of compounds in a stream.

As used herein, the term "openings" refers to holes or apertures below the constriction of the throat merely for the understanding of this document. Particularly, the openings can be the same number, shape or size as the apertures formed above the openings on the compartment or formed by the insert.

DETAILED DESCRIPTION

Figure 1:
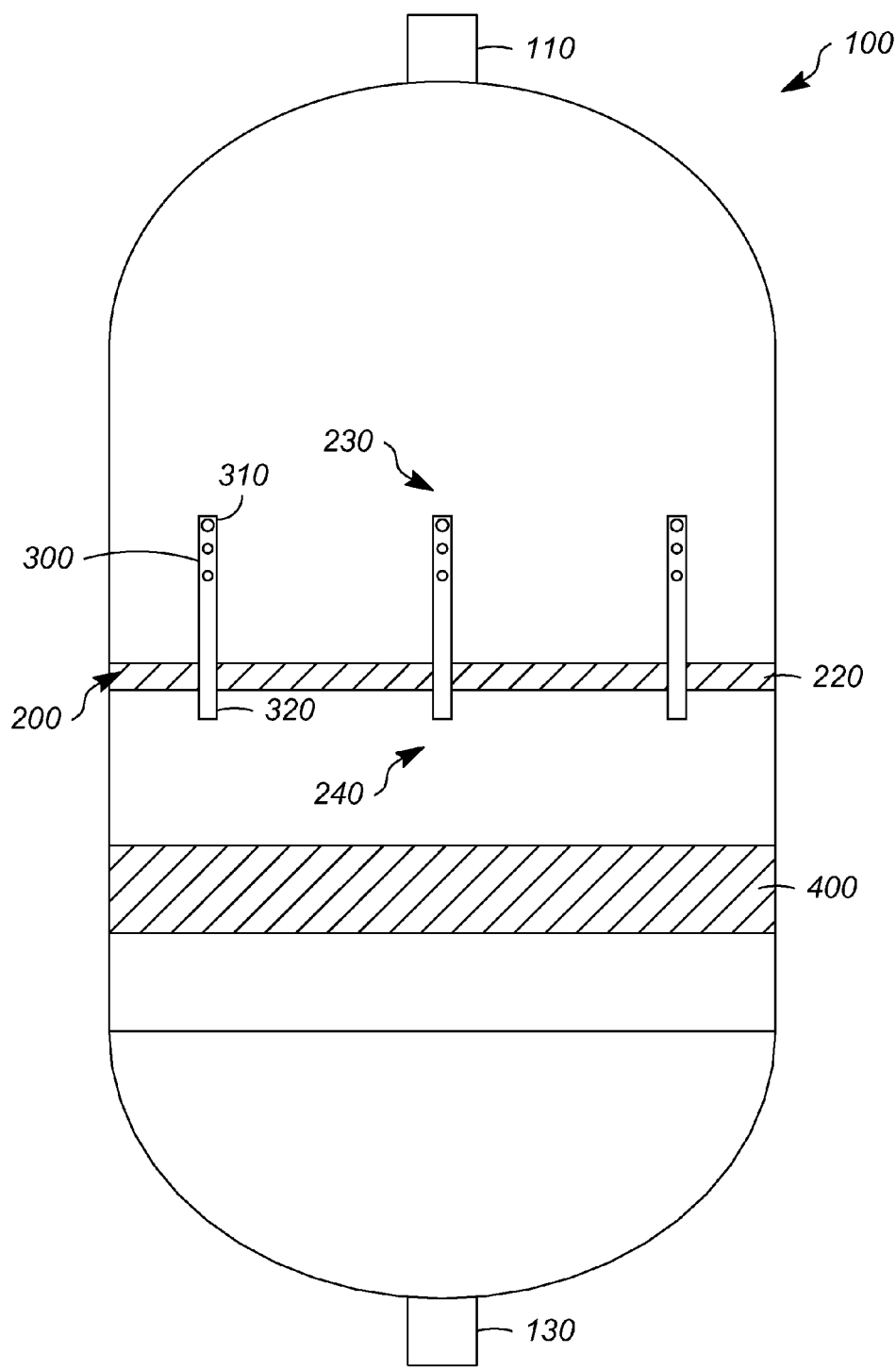
FIG. 1 is an elevational, cross-sectional view of an exemplary vessel.
Figure 2:
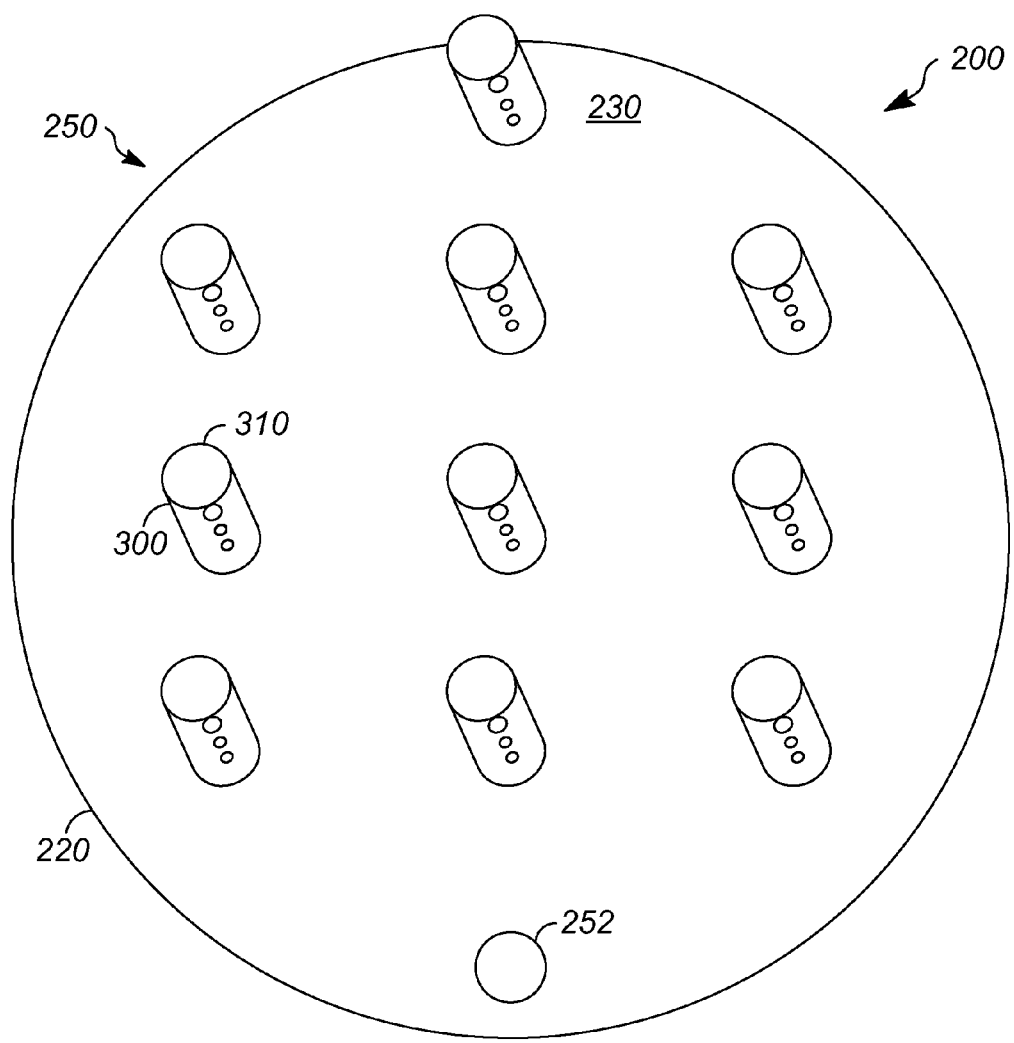
FIG. 2 is a perspective view of an exemplary tray.

Referring to FIGS. 1-2, a vessel 100 is depicted having an inlet 110 and an outlet 130. The vessel 100 can receive a feed of a fluid, including a liquid or a mixed-phase fluid, such as one or more liquids and gases, through the inlet 110. Generally, the feed is distributed in the vessel containing a fixed bed of particles, such as a catalyst. Although a reactor is disclosed herein, it should be understood that other types of vessels such as an absorber or a mass transfer vessel can also use the embodiments disclosed herein, and other materials can be contained instead of or in addition to the catalyst, such as an absorbent. Furthermore, the vessel 100 can be manufactured from any suitable material, such as carbon or stainless steel.

The vessel 100 can include a distribution tray 200 and a packed bed 400 of particles, such as a catalyst. Although only one distribution tray 200 and one packed bed 400 are depicted in this exemplary embodiment, it should be understood that the vessel 100 can contain any number of distribution trays 200 and packed beds 400. An exemplary vessel including multiple packed beds is disclosed in, e.g., US 2006/0163758 A1. In addition, although a feed is discussed as being distributed, any stream or fluid may be distributed, including intermediate streams internal to the vessel 100 or recycle streams.

The distribution tray 200 can include a member 220 having a first side 230 and a second side 240, and at least one compartment 300 for facilitating co-current downflow. Although the member 220 is depicted as circular, it should be understood that the member 220 can take any suitable shape. Generally, the member 220 is impermeable to fluid except wherein the member 220 forms openings 250, and substantially occupying a cross-sectional area of the vessel 100.

Typically, the distribution tray 200 includes at least one compartment 300 that allow the passage of a fluid, such as a liquid or a mixed-phase fluid there-through. The compartments 300 can be arranged in any suitable pattern on the member 220. In this exemplary embodiment, a plurality or ten compartments 300 are depicted, however, any suitable number of compartments 300 can be utilized. Although the compartments 300 are depicted as uncapped, it should be understood that any suitable cap can be utilized, independently, with the compartments 300. In addition, the member 220 can form a plurality of openings 250, as illustrated by an opening 252 with the other openings occupied by a respective compartment. Typically, any opening 252 in the member 220 is adapted to receive a compartment as any unoccupied opening 252 may be susceptible to plugging. As such, the opening 252 is depicted without a compartment 300 for illustrative purposes only and would typically be occupied by a compartment 300 therein. Moreover, it should be understood that each compartment 300 can be the same or different from, respectively, other compartments. In this exemplary embodiment, the compartments 300 can be substantially identical, so only one may be described in particular detail.

Figure 3:
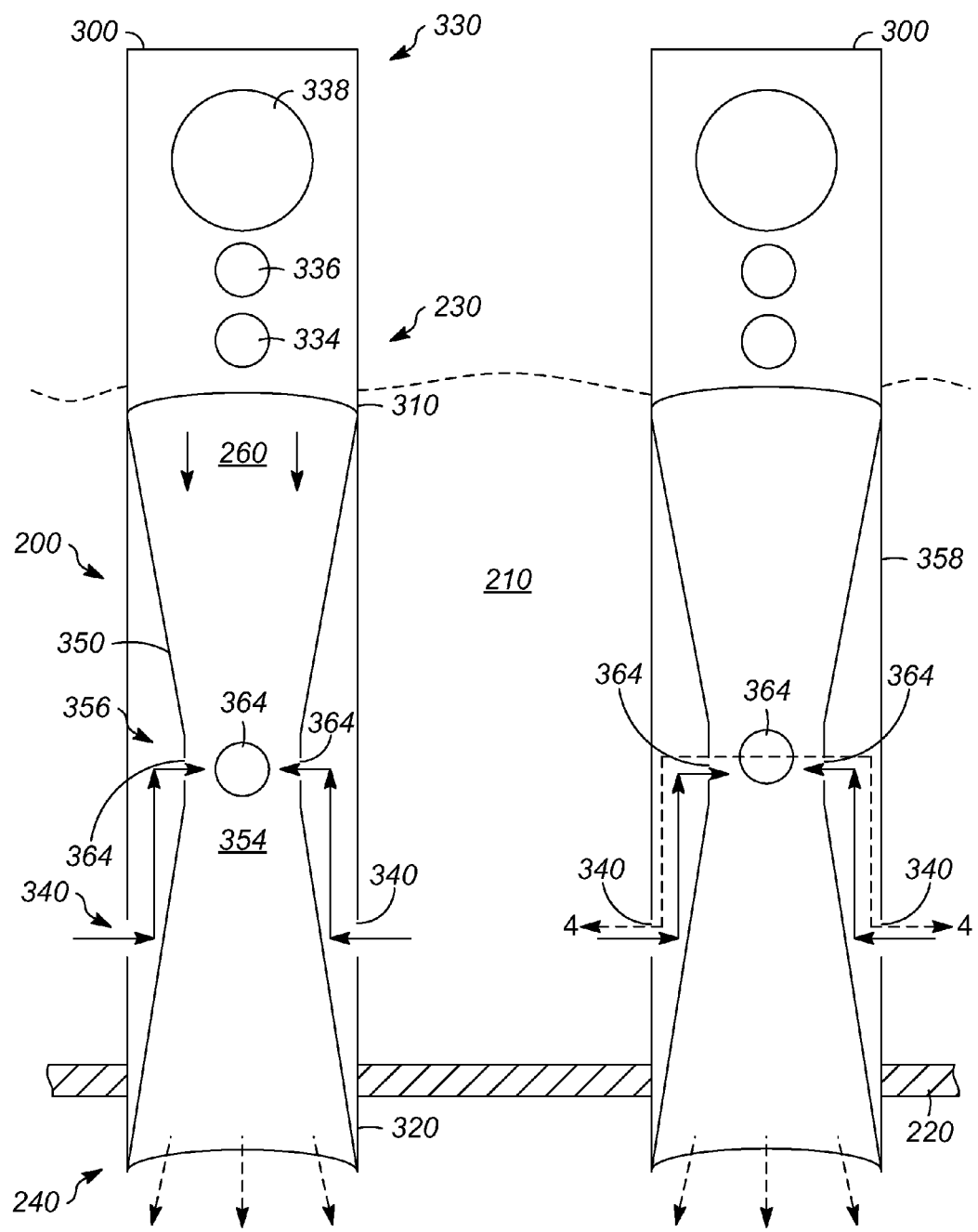
FIG. 3 is an elevational, cross-sectional view of exemplary compartments.

Referring to FIG. 3, two exemplary compartments 300 are depicted. The compartments 300 can take any suitable shape, such as a tube, a prism, an octagonal structure, or any other suitable shape. In this exemplary embodiment, the compartment 300 can have a first portion 310 usually protruding from the first side 230, and a second portion 320 typically protruding from the second side 240.

Figure 4:
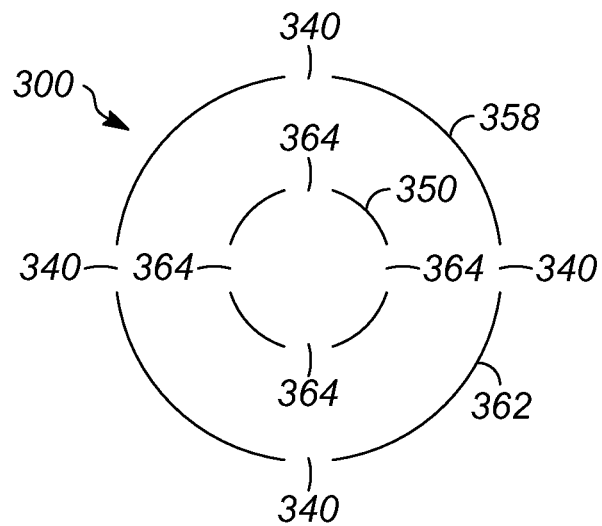
FIG. 4 is a cut-away view along line 4-4 of FIG. 3 of an exemplary compartment.

Referring to FIGS. 2-4, the compartment 300 in this exemplary embodiment can form a tube 358 and further form a plurality of apertures 330, namely a first aperture 334, a second aperture 336, and a third aperture 338. In this particular embodiment, the apertures 330 can be of differing size, namely the third or top aperture 338 at the highest elevation with respect to the member 220 can have a larger diameter than the first aperture 334 or the second aperture 336. In addition, the plurality of apertures 330 can be placed at varying elevations on the compartment 300 to allow the controlled entry of liquid into the compartment 300.

Typically, an insert 350 can be positioned within the compartment 300. Generally, the insert 350 can have two opposing sections, typically cones or funnels, having respective gradually decreasing diameters that may meet to form a constriction 356. The insert 350 can form a substantially venturi-shape to form a throat 354 inside the compartment 300, in this exemplary embodiment a tube 358. Generally, the throat 354 can form the constriction 356 for a fluid, such as a gas 260, flowing downward through the compartment 300. In addition, at least one aperture 364 can be formed in the throat 354 to allow a fluid, such as a liquid, that passes into the compartment 300 to enter the throat 354. Although the insert 350 is substantially venturi-shape in this exemplary embodiment, any suitable shape may be utilized that provides a pressure differential between the inside and outside of the tube 358. Furthermore, the compartment 300 can form a plurality of openings 340 below the constriction 356 in the insert 350. The plurality of openings 340 may be at the same or different elevation, and can be the same or different size and/or shape. The plurality of openings 340 can be positioned below the constriction 356 to allow liquid to flow upward and into the aperture 364. As further depicted in FIG. 4, the compartment 300 can form the plurality of openings 340 along its periphery and the insert 350 can form the plurality of apertures 364 along its periphery as well.

The openings and apertures are depicted as being circular, but it should be understood that these openings can form any suitable shape, such as slots, slits, or any other polygonal shape. Exemplary openings for the compartment, and/or insert, are depicted in, e.g., U.S. Pat. No. 4,140,625. Generally, the openings 340 and apertures 330 and 364 can be any suitable size, such as having a diameter of about 1-about 4 cm.

Figure 5:
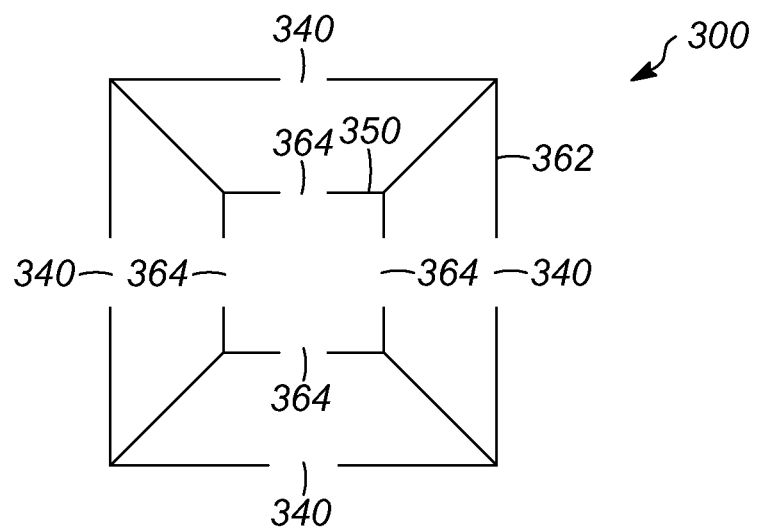
FIG. 5 is another exemplary cut-away view of another exemplary compartment.

Referring to FIG. 5, another exemplary compartment 300 can take the form of a prism 362. Similarly as depicted along the lines of 4-4 in FIG. 3, a prism or square-shaped compartment can have a correspondingly square or prism-shaped insert with corresponding openings 340 and apertures 364.

Referring to FIGS. 1-4, in operation, typically the liquid collected on the distribution tray 200 may rise and pass through the openings 340 in the compartment 300. Afterwards, the liquid can rise within the compartment 300 and pass through the aperture 364 formed in the insert 350. Simultaneously, a fluid, typically one or more gases or a mixture of gases and liquids can pass through the top of the compartment 300 and intermingle with the liquid passing through the aperture 364. The venturi-shape throat 354 can increase the velocity of the fluid passing there-through and create a pressure difference between inside and outside of the throat 354 to draw more liquid 210 into the insert 350. The driving force for the liquid flow from the fluid pressure difference can be adjusted by changing the relative cross-sectional area of the throat 354. The driving force for the liquid flow may be dependent on the liquid level on the member 220. The mixed gas-liquid can be expelled through the expanding nozzle of the insert 350 underneath the member 220 to the packed bed 400 below.

Typically, the low pressure created inside the throat 354 can cause a pressure drop and draw fluid therein. Generally, as liquid 210 level rises above one or more of the apertures 334, 336, and 338 on the first portion 310 of the compartment 300, at least one aperture 330 can receive a small portion of liquid 210 from the member 220. The liquid may flow down the insert 350 along with the gas 260 and mix with the liquid 210 entering the apertures 364.

Usually simultaneously, the pressure drop is increased due to the reduced hole area for liquid flow as a liquid level rises and the increased liquid flow through the venturi-shape throat 354, which in turn can increase the driving force for liquid flow into the openings 340 on the compartments 300. In this way, rising liquid 210 above the distribution tray 200 can increase the liquid flow into the compartments 300. Thus, the distribution tray 200 can be operated in a wider range of liquid flow or gas flow. Another benefit of using the venturi-shape throat 354 is intensifying the vapor-liquid mixing and contact inside the tubes, which can improve heat and mass transfer between the two phases.

Referring to FIGS. 3-4, one advantage of the embodiments disclosed herein is the efficient fabrication of a distribution tray 200. Particularly, an insert 350 can be positioned within a compartment 300, such as a tube 358. Afterwards, the compartment 300 can be inserted into the opening 252 of the member 220. The inserts 350 and the tubes 358 can be fastened using any suitable means, such as welding. Manufacturing in this manner can avoid having to split and then attach separate sections of a nozzle onto a plate.

Figure 6:
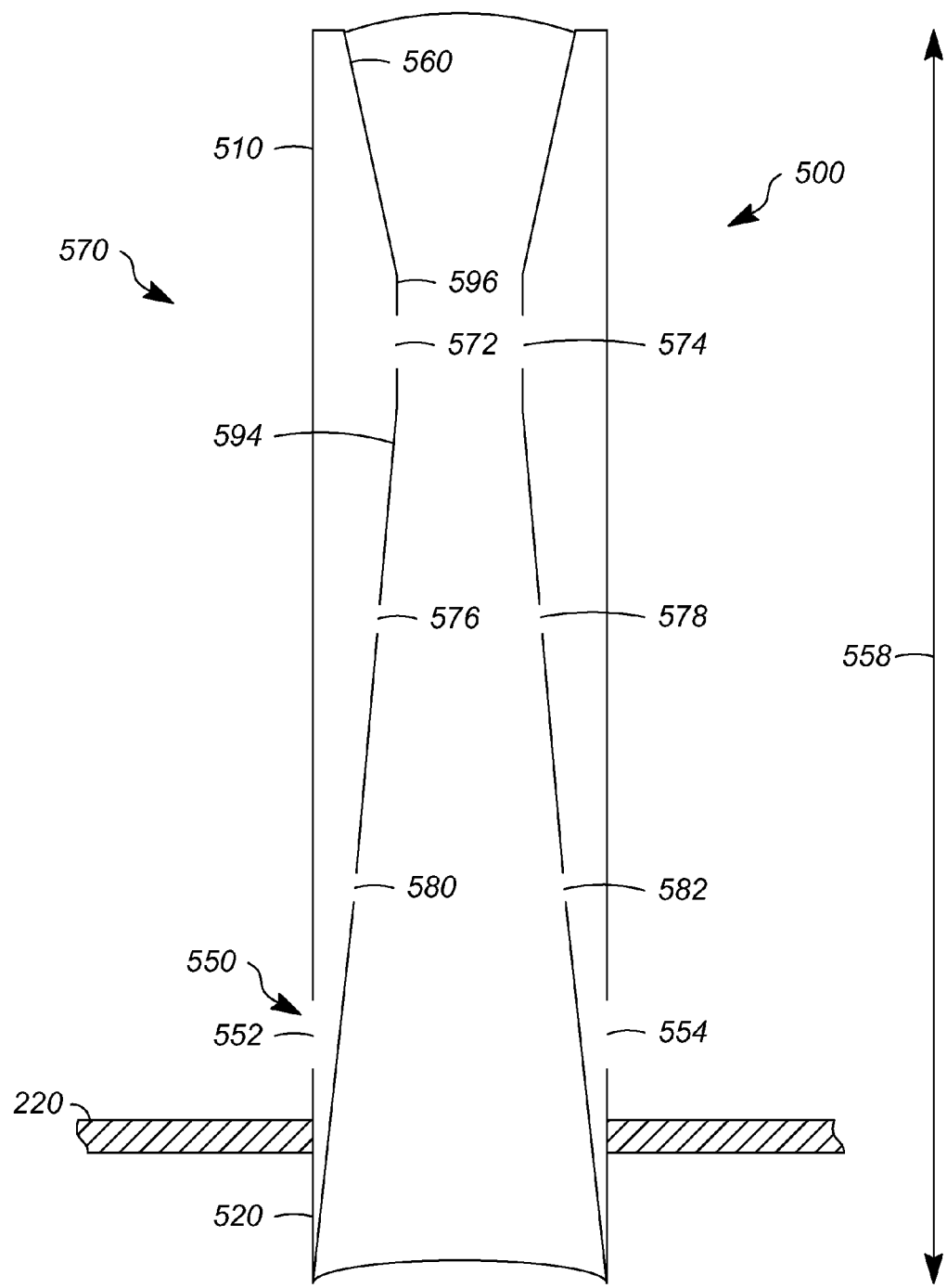
FIG. 6 is an elevational, cross-sectional view of a further exemplary compartment.

Referring to FIG. 6, a further exemplary embodiment of a compartment 500 having a first portion 510 and a second portion 520 with the first portion 510 typically protruding above and the second portion 520 usually protruding below the member 220. The compartment 500 can have a height 558. Generally, an insert 560 is positioned within the compartment 500. The compartment 500 can form a plurality of openings 550 having a first opening 552 and a second opening 554. Usually the openings 550 are equally spaced around the periphery of the compartment 500.

In turn, the insert 560 can form one or more openings 570, including openings 572 and 574 at a first or highest elevation, openings 576 and 578 at a second or middle elevation; and openings 580 and 582 at a third or lowest elevation. Generally, the insert 560 forms a substantially venturi-shaped throat 594 inside the compartment 500 and a constriction 596. Typically, the constriction 596 is formed in the upper half, preferably the upper third, of the compartment 500. The openings 572 and 574 can be at or below the constriction 596. Usually, the total area of the plurality of openings 550 is greater than the total area of the one or more openings 570. As such, the one or more openings 570 can control the flow of liquid into the insert 560. As liquid rises within the walls of the compartment 500, the liquid can pass incrementally through the openings 570 with increasing liquid flow as the elevation of the liquid rises and passes openings 580 and 582, then openings 576 and 578, and even openings 572 and 574. The compartment 500 containing an insert 560 can be fabricated in a similar manner as described above for the tray 200, and operate similarly as described above.

Figure 7:
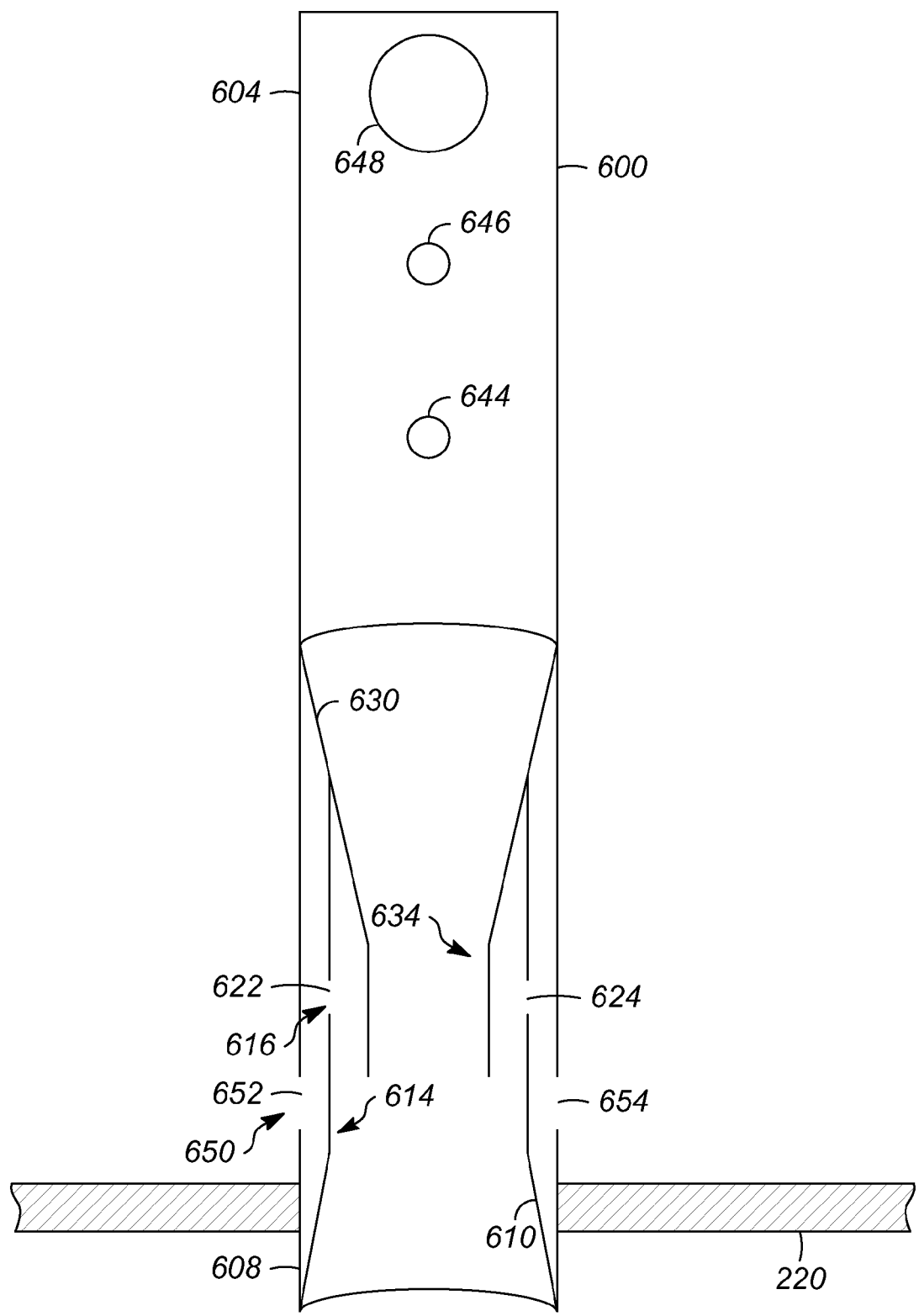
FIG. 7 is an elevational, cross-sectional view of yet another exemplary compartment.

Referring to FIG. 7, yet another exemplary embodiment of a compartment 600 having a first portion 604 and a second portion 608 with the first portion 604 typically protruding above and the second portion 608 usually protruding below the member 220. Generally, a first insert 610 and a second insert 630 are positioned within the compartment 600. Typically, the first insert 610 can be an inverted funnel and the second insert 630 can be a funnel. The inserts 610 and 630 can form respective constrictions 614 and 634 with at least a portion of the second insert 630 in an opposing, nested relationship with at least a portion of the first insert 610. Generally, a diameter of a tube of the first insert 610 is dimensioned for receiving a tube and optionally at least a portion of a cone of the second insert 630. The compartment 600 can form a plurality of openings 650 having a first opening 652 and a second opening 654. Typically the openings 650 are equally spaced around the periphery of the compartment 600.

The first insert 610 can form one or more openings 616, including openings 622 and 624 at an elevation higher than the openings 652 and 654. Generally, the first insert 610 and the second insert 630 are inside the compartment 600. As liquid enters the openings 652 and 654, the liquid can rise and flow through the openings 622 and 624 interacting with a gas flowing downward through the compartment 600 and passing through the constriction 634. Hence, the liquid may take a winding path through the inserts 610 and 630 collectively forming an annular passage in the compartment 600. If excessive liquid is on the member 220, the liquid may pass through an aperture 644, an aperture 646, or even an aperture 648. The compartment 600 containing the inserts 610 and 630 can be fabricated in a similar manner as described above for the tray 200, and can operate similarly as described above.

Figure 8:
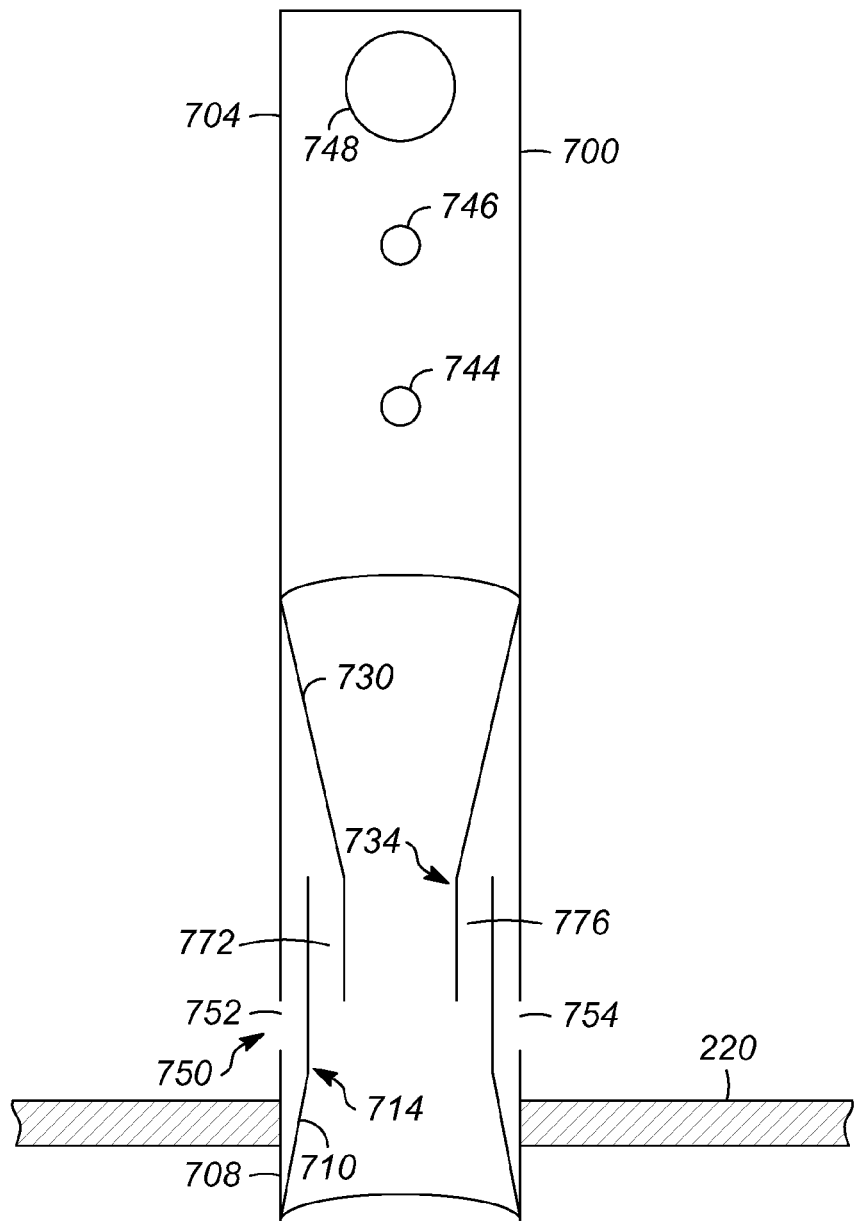
FIG. 8 is an elevational, cross-sectional view of still another exemplary compartment.
Figure 9:
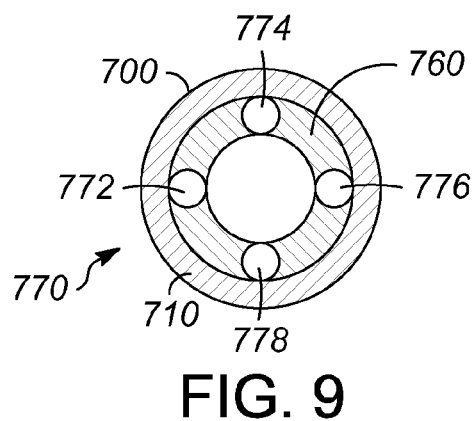
FIG. 9 is a bottom, plan view of the still another exemplary compartment.

Referring to FIGS. 8-9, still another exemplary embodiment of a compartment 700 having a first portion 704 and a second portion 708 with the first portion 704 typically protruding above and the second portion 708 usually protruding below the member 220. Generally, a first insert 710 and a second insert 730 are positioned within the compartment 700. Usually, the first insert 710 can be an inverted funnel-shaped and the second insert 730 can be a funnel-shaped. The inserts 710 and 730 can form respective constrictions 714 and 734 with at least a portion of the second insert 730 in an opposing, nested relationship with at least a portion of the first insert 710. Generally, a diameter of a tube of the first insert 710 is dimensioned for receiving a tube and optionally at least a portion of a cone of the second insert 730. The compartment 700 can form a plurality of openings 750 having a first opening 752 and a second opening 754. Usually the openings 750 are equally spaced around the periphery of the compartment 700.

The first insert 710 can terminate at elevation to form a winding pathway between the inserts 710 and 730. A plug 760 forming a plurality of orifices 770, namely orifices 772, 774, 776, and 778, can be positioned between the inserts 710 and 730 and regulate the liquid flow there-between. Generally, the first insert 710 forms a constriction 714 and the second insert 730 forms a constriction 734 inside the compartment 700. As liquid enters the openings 752 and 754, the liquid can rise and flow through the plurality of orifices 770 interacting with a gas flowing downward through the compartment 700 and passing through the constriction 734. Hence, the liquid may take a winding path through the compartment 700. If excessive liquid is on the member 220, the liquid may pass through an aperture 744, an aperture 746, or even an aperture 748. The compartment 700 containing the inserts 710 and 730 can be fabricated in a similar manner as described above for the tray 200, and can operate similarly as described above.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A distribution tray for a vessel, comprising:
   A) a member forming a first side and a second side wherein the first side is adapted to receive a liquid thereon, and forming a plurality of openings;
   B) a compartment extending through the member with a first portion protruding from the first side and a second portion protruding from the second side and adapted to permit the passage of a fluid there-through; and
   C) an insert positioned within the compartment to constrict and then expand a passage of the fluid there-through wherein the insert forms a constriction and one or more apertures, and the compartment forms a plurality of openings below the constriction.

2. The tray according to claim 1, wherein the insert forms a substantially venturi-shape throat inside the compartment.

3. The tray according to claim 1, wherein the compartment forms a tube.

4. The tray according to claim 1, further comprising a plurality of compartments.

5. The tray according to claim 1, wherein the first portion of the compartment forms a plurality of apertures at different elevations for permitting a fluid to pass there-through.

6. The tray according to claim 1, wherein the insert forms one or more apertures for permitting a passage of a fluid there-through.

7. The tray according to claim 5, wherein the plurality of apertures comprises at least three apertures wherein an aperture at a highest elevation has a diameter larger than each of the other apertures.

8. A distribution tray for a vessel, comprising:
   A) a member forming a first side and a second side wherein the first side is adapted to receive a liquid thereon, and forming a plurality of openings;
   B) a compartment extending through the member with a first portion protruding from the first side and a second portion protruding from the second side and adapted to permit the passage of a fluid there-through; and
   C) an insert positioned within the compartment to constrict and then expand a passage of the fluid there-through, wherein the insert forms a constriction and one or more apertures, and the compartment forms a plurality of openings below the constriction; and wherein the compartment forms a plurality of apertures above the constriction.

9. The tray according to claim 8, wherein the insert forms a substantially venturi-shape throat inside the compartment.

10. The tray according to claim 8, wherein the compartment forms a tube.

11. The tray according to claim 8, further comprising a plurality of compartments.

12. The tray according to claim 8, wherein the plurality of apertures are at different elevations for permitting a fluid to pass there-through.

13. The tray according to claim 8, wherein the one or more apertures permit a passage of a fluid there-through.

14. The tray according to claim 12, wherein the plurality of apertures comprises at least three apertures wherein an aperture at a highest elevation has a diameter larger than each of the other apertures.

* * * * *